(12) United States Patent
Delette et al.

(10) Patent No.: US 9,748,030 B2
(45) Date of Patent: Aug. 29, 2017

(54) ANNULAR SINTERED MAGNET WITH RADIAL MAGNETIZATION AND REINFORCED MECHANICAL STRENGTH

(71) Applicant: Commissariat a l'energie atomique et aux energies alternatives, Paris (FR)

(72) Inventors: Gerard Delette, Grenoble (FR); Gregory Largiller, Saint Martin D'Heres (FR); Sorana Luca, Vizille (FR); Florence Servant, Vaulnaveys le Haut (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/903,521

(22) PCT Filed: Jul. 7, 2014

(86) PCT No.: PCT/EP2014/064434
§ 371 (c)(1),
(2) Date: Jan. 7, 2016

(87) PCT Pub. No.: WO2015/004054
PCT Pub. Date: Jan. 15, 2015

(65) Prior Publication Data
US 2016/0148735 A1 May 26, 2016

(30) Foreign Application Priority Data
Jul. 8, 2013 (FR) ..................... 13 56706

(51) Int. Cl.
*H01F 7/02* (2006.01)
*H01F 41/02* (2006.01)
*H02K 1/02* (2006.01)
*H01F 1/053* (2006.01)
*H01F 1/08* (2006.01)
*H01F 1/055* (2006.01)
*H01F 1/057* (2006.01)
*H01F 1/10* (2006.01)

(52) U.S. Cl.
CPC ......... *H01F 7/0278* (2013.01); *H01F 1/0536* (2013.01); *H01F 1/086* (2013.01);
(Continued)

(58) Field of Classification Search
CPC .. H01F 1/0536; H01F 7/0278; H01F 41/0266; H01F 41/0293; H01F 41/028;
(Continued)

(56) References Cited

U.S. PATENT DOCUMENTS

2003/0192169 A1 10/2003 Reiter, Jr. et al.
2005/0028351 A1 2/2005 Reiter, Jr. et al.
(Continued)

FOREIGN PATENT DOCUMENTS

DE 20 2005 01926 U1 3/2006
EP 0 719 745 B1 6/2003
(Continued)

OTHER PUBLICATIONS

International Search Report issued Sep. 17, 2014 in PCT/EP2014/064434 (with English language translation).
(Continued)

*Primary Examiner* — Bernard Rojas
(74) *Attorney, Agent, or Firm* — Oblon, McClelland, Maier & Neustadt, L.L.P.

(57) ABSTRACT

A sintered annular magnet with a radial orientation of a remanent magnetic field, including: a principal annular part made from a ferromagnetic material, that has a first degree of magnetic anisotropy in the radial direction; and an annular reinforcing part fixed to the principal part of the magnet, the reinforcing part being made from same ferromagnetic material as the ferromagnetic material forming the principal part, and that has a second degree of magnetic anisotropy in the radial direction, the first degree being higher than the second degree.

16 Claims, 8 Drawing Sheets

(52) U.S. Cl.
CPC ....... *H01F 41/028* (2013.01); *H01F 41/0266* (2013.01); *H01F 41/0293* (2013.01); *H02K 1/02* (2013.01); *H01F 1/0557* (2013.01); *H01F 1/0577* (2013.01); *H01F 1/10* (2013.01)

(58) Field of Classification Search
CPC ........ H01F 1/0577; H01F 1/10; H01F 1/0557; H02K 1/02
See application file for complete search history.

(56) References Cited

U.S. PATENT DOCUMENTS

| | | |
|---|---|---|
| 2005/0034788 A1 | 2/2005 | Kim et al. |
| 2010/0171232 A1 | 7/2010 | Servant et al. |
| 2014/0154402 A1 | 6/2014 | Lebrun et al. |
| 2014/0329161 A1 | 11/2014 | Laurencin et al. |

FOREIGN PATENT DOCUMENTS

| | | |
|---|---|---|
| EP | 1 354 653 A1 | 10/2003 |
| EP | 1 548 761 A1 | 6/2005 |
| JP | 7-161512 A | 6/1995 |
| JP | 11-54352 A | 2/1999 |
| JP | 2000-150217 A | 5/2000 |
| WO | WO 94/14175 A1 | 6/1994 |

OTHER PUBLICATIONS

International Preliminary Report on Patentability filed Jul. 7, 2014 in PCT/EP2014/064434 filed Jul. 7, 2014 (submitting English translation only).

Preliminary French Search Report issued Mar. 27, 2014 in Patent Application No. FR 1356706 (with English translation of Categories of Cited documents).

F. Kools, "Complications in Firing Oriented Hexaferrites Due to Anisotropic Effects" "Cracking of Radially Oriented Rings During Firing" Science of Ceramics, vol. 7, 1973, pp. 29-44.

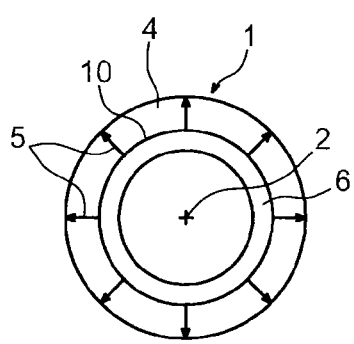
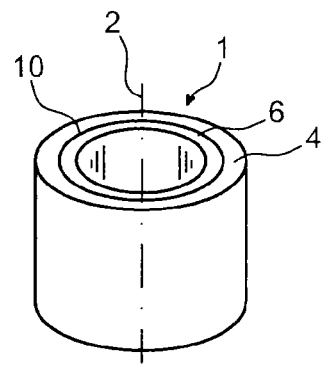
FIG. 1    FIG. 2
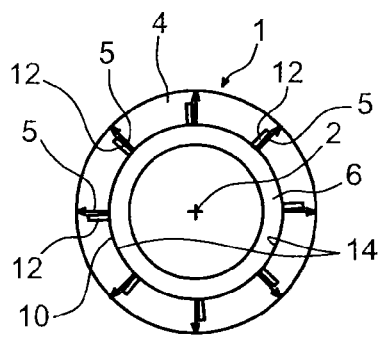
FIG. 3
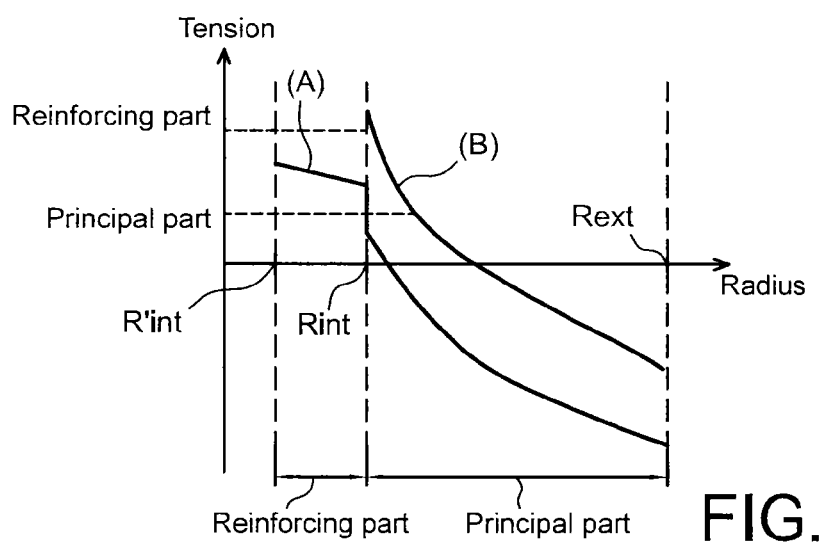
FIG. 3a

ANNULAR SINTERED MAGNET WITH RADIAL MAGNETIZATION AND REINFORCED MECHANICAL STRENGTH

TECHNICAL DOMAIN

This invention relates to sintered magnets with an annular geometry and radial magnetization. These magnets are preferably formed by Powder Injection Moulding (PIM) or by cold powder compression, or by any other technique for forming parts from powder.

The invention is applicable to any technical domain requiring the use of such annular magnets with radial magnetization, for example for the field of electric motors.

Conventionally, "radial magnetization" refers to magnetization along the radial direction (measured at point source), distributed with a symmetry of revolution around the periphery of the annular magnet. In other words, the magnetic field is oriented along the radial direction at all points around the periphery of the annular magnet.

STATE OF PRIOR ART

High performance magnets based on rare earths such as R—Fe—B and R—(Co, Fe) (where R refers to at least one element in the rear earths family), and hexaferrites of the (Sr, Ba)—Fe—O type are usually manufactured using powder metallurgy processes, comprising different principal steps.

Firstly, powders are synthesised with micrometric size grains with the required composition.

The next step is moulding of porous blanks by injection or compression of these powders, and sintering is then done to obtain high density parts.

After sintering, the parts may be ground to achieve the required dimensions and in some cases are coated to protect them from oxidation. They are finally magnetized under a magnetic field in order to acquire a remanent magnetic induction $B_r$ and a maximum energy product $(BH)_{max}$ that are two characteristics of the magnet performance at a given temperature.

The most frequently used forming techniques for moulding blanks are cold compression of dry powders of pastes, or powder injection moulding (PIM). These powder metallurgy techniques combined with consolidation by sintering can be used to make a wide variety of metallic and ceramic components.

Dry powders may be compacted by pressing in a die (uniaxial pressing) or by isostatic pressing, referred to as "cold isostatic pressing" (CIP). In both cases, a small quantity of lubricant, usually less than 5% by mass, is added to the powder that is compacted under high pressure, for example between 500 and 5000 bars. The porosity of the part after pressing is of the order of 20 to 50%. One variant of this method is to prepare a paste that is a mix of powder and organic and/or inorganic compounds, and then to mould this paste by pressing it in a die. After pressing, the organic/inorganic phases are eliminated by a chemical or thermal debinding treatment, leaving a porosity of 20 to 50% within the blank.

The injection moulding technique is frequently used to manufacture large series of various complex shaped objects. In such a method, the first step consists of obtaining a feedstock adapted to the targeted application. Feedstocks are composed of a mix of organic material (or polymeric binder) that is a vector for injection, and inorganic powders (metallic or ceramic). The feedstock is then injected as a thermoplastic material.

After stripping, the part is unbound by thermal or chemical treatments in order to remove the organic phases leaving room for a porosity of 20 to 50% in the blank. Methods for preparing such a feedstock are known to those skilled in the art.

As mentioned above, the most frequently used techniques are cold compression and powder injection moulding, but there are other possible methods (strip moulding, silkscreen printing, inkjet printing, compaction by negative pressure referred to as PressLess Process (PLP).

Regardless of the forming technique selected for the blanks, they may be produced by combining the forming of powders and application of a magnetic field so as to orient the powder particles along a preferred direction.

Porous blanks are densified by high temperature sintering, normally at more than 1000° C., but always less than the melting temperature of the principal phase forming the material. This consolidation, also called sintering, is done by heat treatment in ovens operating under an atmosphere adapted to the type of compound used.

Normally, the part is densified during the heat treatment made using anisothermal gradients and constant temperature plateaux, for which individual characteristics (durations, levels) and sequencing are very precisely adjusted as a function of the material grade. Heat treatments are particularly adapted to the expected densification rate and microstructure. For this reason, it is usually very difficult to perform simultaneous sintering of two materials with different compositions, applying the same heat treatment. When sintering incompatibilities are overcome, it may be possible to consolidate multi-material structures into a single co-sintering treatment. However, chemical inter-diffusion phenomena between the materials remain and may lead to chemical pollution that would be unacceptable in the case of co-sintered magnets with a different material.

At the end of the sintering heat treatment, the part is cooled to ambient temperature and therefore contracts with an amplitude that depends on the values of the coefficient of thermal expansion. The sintered part is polycrystalline by nature, in other words it is composed of strongly bonded crystallographic grains (crystallites with a size of a few microns) derived from particles of the initial powder from which they retain the crystallographic orientation.

Finally, the sintered part is magnetized by application of a magnetic field oriented along a given direction, identified relative to the part. The magnetization field is created by means of a specific electromagnetic device called a magnetizer.

The value of the remanent field $B_r$ of the magnet resulting from magnetization of the sintered polycrystalline part depends firstly on the chemical composition that fixes the value of polarisation at saturation $(J_s)$, and secondly the degree of magnetic anisotropy D of the magnet. The value of the remanent field along a given direction $B_r$ of a magnet may be precisely measured by experimental techniques known to those skilled in the art (for example by means of equipment called a parameter). The same applies for the value of polarisation at saturation $J_s$ that is determined by the magnetic phase from which the magnet is formed.

These latter three physical magnitudes are related by the following formula:

$$B_r = J_s \times D \times \left[ \frac{\rho}{\rho_0}(1-\alpha) \right]^{2/3}$$

In this equation, $\rho$ is the density of the magnet, $\rho_0$ is the theoretical density and $\alpha$ is the volume fraction of the non-magnetic phase. These latter two parameters may also be determined by conventional techniques. Therefore, the previous equation for a given magnet, fixes its degree of anisotropy D. This definition of the degree of anisotropy of a magnet from other characteristic magnitudes of the magnet is frequently used. For example it is used in document EP 0 719 745 B1, in which the degree of anisotropy is called the degree of orientation.

The degree of magnetic anisotropy D depends also on the orientation of the axes of easy magnetization of crystallographic grains making up the material.

This orientation is identified relative to the direction of the field used for the magnetization and in which the remanent field $B_r$ is measured. The axis of easy magnetization of an individual grain of the sintered material (crystallite) corresponds to a particular direction identified relative to the principal axes of the crystallographic lattice. Alignment of the axis of easy magnetization of a crystallographic grain relative to a given direction requires that the crystallographic lattice, in other words the grain (crystallite) in its entirety, is rotated.

When the axes of easy magnetization of grains are all aligned along the same direction, the material has a maximum degree of magnetic anisotropy D that is equal to 1. The material is then qualified as a fully anisotropic material. Conversely, when the axes of easy magnetization of grains are oriented at random, the material has a lower degree of magnetic anisotropy, for example D=½, and the material is then considered as being perfectly isotropic. Intermediate values of the degree of magnetic anisotropy ½<D<1 characterise partially anisotropic materials. For a part with an annular geometry, the field creating the magnetization is oriented along the radial direction of the magnet, in other words it is in the radial direction at all points around the periphery of the part.

Thus, the degree of magnetic anisotropy along the radial direction is conventionally used to characterise the orientation of axes of easy magnetization relative to this particular direction. In the following, the degree D of magnetic anisotropy will always be defined relative to this radial direction of parts, and will be considered as being the ratio between the remanent field $B_r$ measured along this direction and the maximum value $B_r^{max}$:

$$D = \frac{B_r}{B_r^{max}}$$

where the maximum value of the remanent field of the magnet $B_r^{max}$ is given by the following equation:

$$B_r^{max} = J_s \times \left[\frac{\rho}{\rho_0}(1-\alpha)\right]^{2/3}$$

The axes of easy magnetization of powder particles are aligned along a single direction during the first stages of forming magnetic powders, in order to increase the degree of magnetic anisotropy of the sintered part. The single direction is the radial direction, according to the meaning given above.

In this step of the method, magnetic powder particles are only very slightly bound to each other, and can be oriented individually by a rotation movement of the particle along the direction imposed by the external magnetic field. To achieve this, powder particles must themselves be anisotropic, in other words the axes of easy magnetization within these particles must be aligned along a preferred direction. This condition is satisfied naturally when the particles used are monocrystalline, in other words they are composed of a single crystallographic grain. It is also satisfied through the use of anisotropic polycrystalline powder particles. These powders are designated by this name when each powder particle is itself composed of several crystallographic grains assembled to each other all with the same orientation (HDDR (Hydrogenation Decrepitation Decomposition Recombination) type powders). Monocrystalline or polycrystalline anisotropic powders are referred to as anisotropic powders.

Conversely, powders composed of isotropic polycrystalline particles, in other words particles in which grain directions are at random, are referred to as isotropic powders. These isotropic powders cannot be aligned so as to produce a sintered part with a degree of magnetic anisotropy more than 0.5.

The intensity of the magnetic field necessary to orient anisotropic powders incorporated within a feedstock for PIM injection is of the order of 0.5 to 3 T continuously, whereas it is 2 to 8 T in a pulsed field for pressing compacted dry powders (for cold compression of powders by CIP or in uniaxial press). For information, document EP 1 548 761 A1 discloses a method for orienting powder particles within an annular cavity along the radial direction, using an electromagnetic device. The degree of anisotropy of all powder particles obtained after compression is typically more than 0.8.

Concerning applications of magnets manufactured by methods that have already been described, a distinction is made particularly between magnetic coupling systems and electric motors, such as servomotors or DC brushless motors. In these systems, curved permanent magnets are mounted at the periphery of cylindrical parts that are driven in rotation about their principal axis (for example as in the rotor of an electric motor). In the case of motors, integration of an sintered annular magnet with a radially oriented magnetization (D=1) with a high intensity (close to the theoretical limit, $B_r=B_r^{max}$) in these motors, is particularly advantageous for a number of reasons.

Firstly, a radial orientation of the remanent field of the magnet can give maximum torque between the rotor and the stator, while minimising noise nuisances and vibrations. Furthermore, since the torque amplitude depends on the intensity of the remanent field, motor performances are improved by the use of a magnet with a strong magnetic anisotropy. In this case, all microscopic magnetic moments of the material are aligned and are additive, which produces a maximum remanent field along this direction. This accumulation effect is particularly important when the material density is high, which is the case with a sintered material. This can give compact rotors with high energy densities rotating at very high speed.

Furthermore, operation at high rotation speed, for example more than 80 000 rpm, generates inertial forces on magnets that tend to tear them off the rotor, or even to fragment them. The use of a magnet with the shape of a radial ring can result in a very stable assembly with the rotor.

Fabrication of an anisotropic annular magnet by powder metallurgy introduces the risks of cracking of the part due to thermomechanical stresses inherent to the forming method, and this risk has to be overcome.

These internal stresses appear during cooling after the sintering step and originate from two characteristics specific to this type of magnet.

The first characteristic is the anisotropic thermomechanical behaviour of the material originating from the preferred orientation of axes of easy magnetization. In particular, thermal expansions are very different between the radial direction of the part corresponding to the direction of easy magnetization carrying the remanent field, and the other two principal directions, thus causing strain incompatibilities within the part during temperature variations.

The second characteristic is the so-called "closed" geometry of the ring, which prevents distortion of the part. On the contrary, with so-called "open" geometries such as tiles, these strains facilitate the accommodation of internal stresses.

Elimination of one of the above two conditions eliminates thermomechanical stresses in the material during sintering, but at the detriment of performances of the magnetic system. The solutions disclosed in prior art for manufacturing radial rings using powder metallurgy techniques described above, systematically lead to a reduction in magnet performances.

For example, document JP 2000-150217 discloses the addition of non-magnetic elements in the initial alloy, conferring plastic strain properties onto the magnet so that manufacturing stresses can be accommodated. However, additional elements modify the composition of the alloy and reduce the value of the maximum polarisation of the magnet and therefore of the remanent field.

Document <<JP 07-161512>> discloses a method of manufacturing a ring with radial orientation by the assembly of several angular sectors manufactured separately. In this case, parts have to be machined precisely to make a regular assembly. However, junctions between sectors form mechanically weak points incompatible with high loads that can result from high speeds, vibrations, etc.

The document by Kools, "Complications in Firing Oriented Hexaferrites Due to Anisotropic Effects," "Cracking of Radially Oriented Rings During Firing," Science of Ceramics, vol. 7, pp. 29-44, (1973), demonstrates that thin anisotropic ferrite rings with radial orientation, in other words rings for which the ratio between their internal radius and external radius is more than 0.85, can be manufactured without cracks due to sintering. For these thin rings, manufacturing stresses are less than the mechanical strength of the material. However, in this case, the volume of the magnet is reduced, consequently reducing the global performances of the magnetic system.

Finally, document <<JP 11-054352>> is based on a reduction of the degree of magnetic anisotropy within the ring, within a proportion that reduces incompatibilities between thermal expansions in the radial and tangential directions. Once again, magnet performances are reduced, due to its remanent field that depends on the degree of anisotropy.

PRESENTATION OF THE INVENTION

Therefore, the purpose of the invention is to at least partially overcome the disadvantages mentioned above related to embodiments according to prior art.

To achieve this, the purpose of the invention is firstly a sintered annular magnet with a radial orientation of the remanent magnetic field, said magnet comprising:

a principal annular part made from a ferromagnetic material that has a first degree D1 of magnetic anisotropy in the radial direction; and an annular reinforcing part fixed to said principal part of the magnet, the reinforcing part being made from a ferromagnetic material with the same principal magnetic phase(s) as the ferromagnetic material forming the principal part, and that has a second degree D2 of magnetic anisotropy in the radial direction, the first degree D1 being higher than the second degree D2.

The invention is advantageous because it allows for the addition of a reinforcing part that has a weaker anisotropy than the principal part of the magnet, and therefore is capable of creating stresses opposing the stresses encountered within the principal part. Consequently the risks of this principal part cracking are very much reduced.

Furthermore, since the reinforcing part is composed of the same ferromagnetic material as the principal part or at least has the same principal magnetic phase(s) in the conventional meaning that will be summarised below, these two principal and reinforcing parts are thus perfectly compatible and their junction, for example obtained during a simple co-sintering operation of the powders forming the reinforcing and principal parts, is found to be very satisfactory.

In particular, there is no need to add a foreign material to make this mechanical junction, since the two parts can be brought directly into contact with each other. Apart from the associated extra cost, the addition of a foreign material for the assembly of parts of the magnet forms a pollution source that could degrade performances of the magnet. Therefore, this disadvantage is avoided by the production of a single-piece magnet according to the invention.

Furthermore, the specific design of the magnet according to the invention makes it easy to envisage its production using existing techniques for the manufacture of homogeneous magnets.

Finally, the magnet according to the invention may be made without any dimensional constraint. In particular, it may have a thick principal part, unlike some embodiments according to prior art.

The invention may have at least one of the following preferred characteristics, taken individually or in combination with each other.

Said reinforcing part is arranged at the internal periphery of the principal part of the magnet. Alternately, it may be placed externally around the principal part.

The ratio between the average radial thickness of the principal part and the average radial thickness of the reinforcing part is between 0.1 and 5, and is more preferably between 0.5 and 2.

The ratio between the inside diameter and the outside diameter of the principal part of the magnet is between 0.5 and 0.85.

The ferromagnetic material forming the principal and reinforcing parts of the magnet belongs to one of the following three types of compounds:

R—Fe—B alloys with the $R_2Fe_{14}B$ principal magnetic phase where R is an element in the rare earths family;

R and Co alloys with $RCo_5$ and $R_2Co_{17}$ principal magnetic phases where R is an element in the rare earths family;

hexaferrites with the $MFe_{12}O_{19}$ principal magnetic phase where M=Ba or Sr.

The interface between the principal part of the magnet and its reinforcing part is structured. In other words, it is not circular in this case, but for example it is provided with projections and recesses arranged alternately along this interface.

Structuring of the interface can firstly improve the mechanical strength of the magnet. Projections can then be considered as teeth reinforcing the anchorage of the reinforcing part in the principal part of the magnet. Structuring can also modulate the intensity of the magnetic field after final magnetization, along the circumferential direction.

The first degree D1 of magnetic anisotropy along the radial direction is more than 0.8 and the second degree D2 is less than 0.8, the ratio between the two preferably being between 1 and 2.

Another purpose of the invention is an assembly of blanks to obtain an annular sintered magnet as described above, the assembly comprising:
- a blank of the principal annular part made from a first ferromagnetic material powder, that has a first degree D1 of magnetic anisotropy along the radial direction of the assembly of blanks; and
- a blank of the annular reinforcing part adjacent to said blank of the principal part of the magnet, the blank of the reinforcing part being made from a second ferromagnetic material powder with the same principal magnetic phase(s) as the first ferromagnetic material powder, that has a second degree D2 of magnetic anisotropy along the radial direction of the assembly of blanks, the first degree D1 being higher than the degree D2.

The ferromagnetic material making up the powders used for forming blanks preferably belongs to one of the following three types of compounds:
- R—Fe—B alloys for which the principal magnetic phase is $R_2Fe_{14}B$ where R is an element in the rare earths family,
- R and Co alloys for which the principal magnetic phases are $RCo_5$ and $R_2Co_{17}$ where R is an element in the rare earths family,
- hexaferrites for which the principal magnetic phase is $MFe_{12}O_{19}$ where M=Ba or Sr.

Therefore this assembly of blanks will be sintered and a magnetization step will then be carried out under a magnetic field in order to acquire a remanent magnetic induction after which the magnet is obtained. In the case of blanks obtained by injection, the assembly according to the invention preferably does not include feedstock vectors which will previously have been eliminated by debinding.

Furthermore, in the assembly of blanks according to the invention, the blank of the reinforcing part may have been partially sintered, for example to reach up to 95% of its final density, before co-sintering of the two blanks.

Obviously, the preferred characteristics of the assembly of blanks according to the invention may be identical or similar to those of the magnet disclosed above.

Another purpose of the invention is a method of manufacturing a magnet like that described above, in which blanks of the principal part and of the reinforcing part are made using one or more powder forming technique(s), preferably by powder injection or by powder cold pressing. However, other powder forming techniques known to those skilled in the art may be used to manufacture these blanks (for example strip moulding, silk-screen printing, inkjet printing, PressLessProcess>>(PLP), etc.).

Then regardless of the selected forming method, the blanks are densified by co-sintering, so that they can be assembled simultaneously. Co-sintering conventionally refers to simultaneous sintering of two or several parts in contact, during which grains at the interfaces between the parts bond to each other to form rigid junctions between the parts.

Since the two blanks are made based on the same ferromagnetic material or based on ferromagnetic materials with at least the same principal magnetic phases, the co-sintering step also called simultaneous sintering, is perfectly controlled. In particular, an identical heat treatment and sintering atmosphere are suitable for densification of the two blanks.

The method according to the invention may have at least one of the following preferred characteristics taken independently or in combination with each other.

The blank of the reinforcing part and the blank of the principal part are made by co-injection.

According to a first possibility, the blank of the principal part is made from a first feedstock comprising an anisotropic powder P1 of said ferromagnetic material, and the blank of the reinforcing part is made from a second feedstock comprising an isotropic powder P2 of a ferromagnetic material with the same principal magnetic phase(s) as the anisotropic powder P1.

According to a second possibility, the blank of the principal part is made from a first feedstock comprising an anisotropic powder P1 of said ferromagnetic material and a first injection vector V1, and the blank of the reinforcing part is made from a second feedstock comprising the anisotropic powder P1 of said ferromagnetic material, and a second injection vector V2 chosen such that the aptitude of powder particles to orient their axis of easy magnetization along the radial direction of the magnet under a magnetic field is less than the aptitude of the first vector V1.

According to a third possibility, the blank of the principal part is made from a first feedstock comprising an anisotropic powder P1 of said ferromagnetic material and a first injection vector V1, and the blank of the reinforcing part is made from a second feedstock comprising the same anisotropic powder P1 and the same first injection vector V1, the powder content ratio Tc1 in the first feedstock being different from the second powder content ratio Tc2 in the second feedstock such that the aptitude of powder particles to orient their axis of easy magnetization along the radial direction of the magnet under a magnetic field is less than the aptitude of the first feedstock.

Furthermore, the blank of the reinforcing part may be made before subsequently being used as part of the mould to make the blank of the principal part. This is insert moulding of the principal part on the reinforcing part.

Furthermore, the blank of the reinforcing part may be partially sintered before being used as a mould for manufacturing the blank of the principal part.

Finally, the blank of the partially sintered reinforcing part is magnetised so as to orient the axis of easy magnetization of the grains of the blank of the principal part along the radial direction of the magnet, when the principal part is manufactured. Preferably, the above-mentioned magnetization may be made in a specific magnetic device (magnetiser) independent of the forming equipment for the blank of the principal part.

Other advantages and characteristics of the invention will become clear after reading the following non-limitative detailed description.

BRIEF DESCRIPTION OF THE DRAWINGS

This description will be made with reference to the appended drawings among which:

FIG. 1 shows a diagrammatic sectional view of a magnet according to one preferred embodiment of the invention;

FIG. 2 shows a diagrammatic perspective view of the magnet shown on the previous figure;

FIG. 3 shows a view similar to the view in FIG. 1, with the magnet made according to an alternative embodiment;

FIG. 3a is a graph comparing the profile of mechanical stresses occurring along the radius of a homogeneous ring according to prior art, with the stress profile within a two-part ring specific to the invention;

DETAILED PRESENTATION OF PREFERRED EMBODIMENTS

Figure 4A:
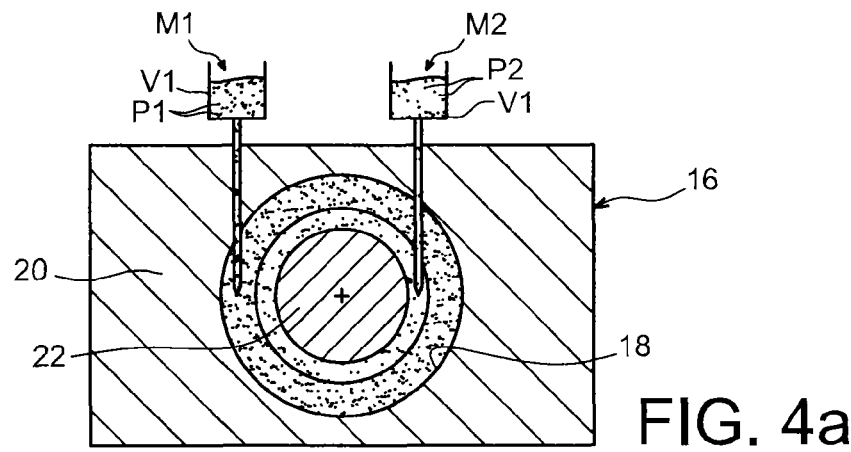
FIGS. 4a to 4d show successive different steps in a method of manufacturing the magnet in FIGS. 1 and 2, according to a first preferred embodiment of the invention.
Figure 4B:
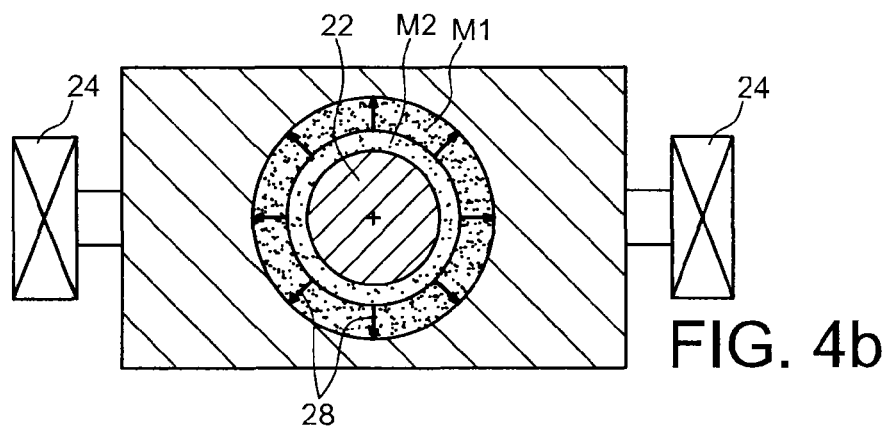

Firstly with reference to FIGS. 1 and 2, the figures show an annular sintered magnet with axis 2, with a radial orientation of the remanent magnetic field shown diagrammatically by arrows 5. As mentioned above, conventionally this is a magnetization along the radial direction (measured at points), distributed with a symmetry of rotation about the periphery of the annular magnet. In other words, the magnetic field is oriented along the radial direction at all points on the periphery of the annular magnet.

Globally, the magnet is composed of two concentric parts, fixed to each other, and forming a single-block type assembly. There is firstly a principal part 4 of the magnet that is annular in shape and is made from a ferromagnetic material, taken from among R—Fe—B alloys, and R and Co alloys where R is an element in the rare earths family and hexaferrites of Ba or Sr.

The principal part 4 forming the external part of the magnet comprises a ferromagnetic material with a first degree D1 of magnetic anisotropy along the radial direction. In this case, and throughout the remainder of this description, the expression <<degree of magnetic anisotropy>> must be understood in the conventional meaning described above. This degree D1 is preferably higher than 0.8, reflecting a preferred orientation of axes of easy magnetization along the radial direction.

The inner part of the magnet, fixed to the inner periphery of the principal part 4, is composed of an annular reinforcing part 6. It is made from the same ferromagnetic material as the principal part.

The expression "same ferromagnetic materials" means materials with the same chemical composition.

Alternately, the two materials used could have slightly different chemical compositions while maintaining the same principal magnetic phase(s).

In this respect, it should be noted that a ferromagnetic material comprises one or several principal magnetic phases, and non-magnetic secondary phases (for example distributed at grain boundaries) that are compatible with the principal magnetic phases during sintering. Therefore in the invention, the two ferromagnetic materials have at least the same principal magnetic phases, but the non-magnetic secondary phases may be different in different materials.

Furthermore, it is understood that the principal magnetic phase(s) of the principal part of the sintered magnet may be doped according to the state of the art without going outside the scope of the invention. In other words, a doped principal magnetic phase within the principal part of the magnet must be considered as being identical to the same principal magnetic phase that is undoped or doped differently within the reinforcing part of this magnet. In this case, the concept of "grades" of a particular principal magnetic phase is introduced.

The principle of doping a principal magnetic phase of a magnet is known to those skilled in the art, and is briefly mentioned below.

Some chemical elements within principal magnetic phases may be substituted by other compatible chemical elements to improve an intrinsic property of the phase (for example magnetocrystalline anisotropy). This substitution, also referred to as doping, applies to not more than 10% of the global mass of all chemical elements in the principal magnetic phase of the ferromagnetic material. The following table gives some possible substitution examples.

| Ferromagnetic material | Principal magnetic phases | Possible substitutions within the principal magnetic phase (also called doping) |
| --- | --- | --- |
| R—Fe—B (where R denotes at least one element in the rare earths family) | $R_2Fe_{14}B$ Where R may for example be Nd (neodymium), Ce (Cerium) | R → Tb (Terbium), Dy (dysprosium), Pr (praseodymium) For example, Nd (neodymium) in the principal magnetic phase may be replaced by Tb and/or Dy and/or Pr. AND/OR Fe → Co, Al, Zr Fe (iron) in the principal magnetic phase may be replaced by Co (cobalt) and/or Al (aluminium) and/or Pr (praseodymium). |
| R—Co (where R denotes at least one element in the rare earths family), | $RCo_5$ and $R_2Co_{17}$ | R → Pr, Ce Co → Fe, Cu |
| M—Fe—O Where M = Ba or Sr. | $MFe_{12}O_{19}$ | M → La, Sm, Nd Fe → Ti, Al, Zn, Sn |

Substitutions within the magnetic phase are advantageous because they can improve an important magnetic property of the ferromagnetic material, namely its coercivity. These substitutions also have an effect on the physical properties and particularly on the coefficients of thermal expansion. For example, the substitution of Fe by Ti within the $MFe_{12}O_{19}$ phase gradually modifies values of the coefficient of thermal expansion.

Only ferromagnetic materials with the same principal magnetic phases as defined above, are thermodynamically compatible with each other during a high temperature heat treatment (for example at more than 1000° C.), such as sintering. For example, the $MFe_{12}O_{19}$ principal magnetic phase is sintered under air while the $R_2Fe_{14}B$ principal magnetic phase is sintered under a secondary vacuum to guarantee its stability. Co-sintering of the two above-mentioned ferromagnetic materials would completely destabilise the magnetic phases, which would therefore not be maintained.

However, as mentioned above, a composition with a particular principal magnetic phase, comprising one or several substitution elements remains compatible with the unsubstituted magnetic phase from which it was derived, or with this particular phase with different substitutions, during co-sintering. In this case, each phase remains thermodynamically stable during co-sintering.

Nevertheless, throughout the remainder of the description, it will be assumed that these two ferromagnetic materials are identical, although this is not necessarily the case, within the limits described above.

Furthermore, a second degree D2 of anisotropy is provided in the reinforcing part 6 along the radial direction, the degree D1 being higher than the degree D2. For example, the degree D2 is less than 0.8, and the ratio between D1 and D2 may for example be between 1 and 2. The reinforcing part then has weak anisotropy, that will limit risks of cracking of the principal part 4 that is itself strongly anisotropic.

The ratio between the average radial thickness of the principal part and the average radial thickness of the reinforcing part is preferably between 0.1 and 5, and even more preferably between 0.5 and 2. Furthermore, the ratio between the inside diameter and the outside diameter of the principal part 4 of the magnet is between 0.5 and 0.85. Consequently, the magnet according to the invention may have a substantial thickness.

As described above, cooling of a homogeneous ring according to prior art composed of a single ferromagnetic material having a uniform orientation of axes of easy magnetization along the radial direction (D>0.5), causes the appearance of thermomechanical stresses along the tangential direction. These stresses originate from the difference in coefficients of thermal expansion along the radial direction $\alpha_r$ and the tangential direction $\alpha_t$. The free stress state corresponds to the end of the sintering plateau at high temperature, in other words more than 1000° C. In such a ring, the tensile stress is maximum during complete cooling of the sintered part, from the temperature of the plateau $T_f$ to ambient temperature $T_\alpha$. This tensile stress imposed by the method is located on the internal radius of the ring. It can be estimated from the following equation:

$$\sigma_t^{max} = \frac{(\alpha_r - \alpha_t)\Delta T \cdot E_r}{2} \frac{k^2}{1-k^2}\left[k\frac{1-\rho^{1+k}}{1-\rho^{2k}}\rho^{k-1} - k\frac{1-\rho^{1-k}}{1-\rho^{-2k}}\rho^{-k-1} - 1\right]$$

Where:

$\Delta T = T_\alpha - T_f$ $E_r$=Young's modulus of the sintered material along the radial direction $E_t$=Young's modulus of the sintered material along the tangential direction $k=\sqrt{E_t/E_r}$ $\rho=R_{int}/R_{ext}$: ratio of inner and outer radii of the ring When this stress imposed by the method reaches the tensile strength of the material, a crack develops along the radial direction of the ring. In the case of a homogeneous ring for which the degree of alignment along the radial direction D is 1, this manufacturing stress increases when the ratio of the radii $R_{int}/R_{ext}$ reduces. In other words, the risk of cracking increases with the thickness of the ring. Furthermore, the following table gives the smallest values of the $R_{int}/R_{ext}$ ratio that can be achieved for homogeneous rings with radial orientation, composed of different ferromagnetic materials.

| Material | Allowable tensile stress | Minimum value of the $R_{int}/R_{ext}$ ratio |
| --- | --- | --- |
| NdFeB | 160 Mpa | 0.60 |
| SmCo | 35 MPa | 0.90 |
| SrFeO | 85 MPa | 0.86 |

The reduced degree of alignment along the radial direction (D<1) makes it possible to make thicker homogeneous rings. The level of thermomechanical stresses reduces with the alignment parameter D. This is due to the fact that the reduction in the parameter D implies an attenuation of the difference between coefficients of thermal expansion along the radial and tangential directions. The following equation can be used to estimate the difference between the coefficients of thermal expansion as a function of the degree of alignment:

$$(\alpha_r - \alpha_t)_D = (\alpha_r - \alpha_t)_{D=1} \times [D(2D-1)]$$

Therefore, manufacturing of thick homogeneous rings is not compatible with obtaining a high degree of alignment and therefore is incompatible with high magnetic properties (Br). A compromise has to be found between mechanical strength and magnetic flux output by the annular magnet.

The following table gives values of the maximum degree of orientation that can be achieved in the state of the art for different values of the $R_{int}/R_{ext}$ ratio.

| Material | $R_{int}/R_{ext}$ = 0.9 | $R_{int}/R_{ext}$ = 0.8 | $R_{int}/R_{ext}$ = 0.7 | $R_{int}/R_{ext}$ = 0.6 |
| --- | --- | --- | --- | --- |
| SmCo | $D_{max}$ = 1 | $D_{max}$ = 0.77 | $D_{max}$ = 0.68 | $D_{max}$ = 0.63 |
| SrFeO | $D_{max}$ = 1 | $D_{max}$ = 0.88 | $D_{max}$ = 0.76 | $D_{max}$ = 0.69 |

Manufacturing of rings in two parts as disclosed in the invention can overcome the above limitations on the dimensions and/or degree of orientation. As disclosed above, the principle of the invention consists of using part of the ring as a mechanical reinforcement to which mechanical stresses harmful for the principal part of the magnet can be transferred. The principal part is then relieved of thermomechanical stresses and can be manufactured with optimum magnetic properties in accordance with what is expected with the ferromagnetic material. This principle is shown in FIG. 3a, that compares the profile of mechanical stresses imposed by the method along the radius of a homogeneous ring according to prior art, without reinforcement (curve (B)), with a stress profile within a two-part ring as described in the invention (curve (A)).

As can be seen on the graph in FIG. 3a, the principal part in the invention is thus prestressed by the reinforcing part so as to reduce the tensile stress value below the allowable value (tensile strength of the material). The prestress value depends on the differential of the coefficients of thermal expansion between the reinforcement and the principal part:

$$\sigma_t^{pre} \propto (\alpha_r^{renfort} - \alpha_r^{partie\ principale})$$

The values of coefficients of thermal expansion in the two parts with the same principal magnetic phase, depend on the magnetic phase considered and on microstructure parameters such as the degree of orientation, the grain morphology, the nature and content of substitution elements in the principal magnetic phase. These parameters may be adjusted on each of the two parts of the ring without modifying the magnetic phase, so as to keep the stress level imposed by the method below the tension limit of each of the two parts and thus avoid cracking. A precise calculation of stresses can be made by a thermomechanical analysis using a structural calculation software based on the Finite Elements Method. These calculation codes are frequently used and are well known to those skilled in the art, and they will not be described further herein.

This principle is applied in the following three examples:

1. Manufacturing of the SmCo Type of Anisotropic Sintered Rings

SmCo type ferromagnetic materials have the lowest tensile strength (typically 35 MPa) of all materials considered, such that rings with radial orientation in which the Rint/Rext ratio of the radii is less than 0.9 cannot be made by sintering. In the following example, it is demonstrated that an SmCo type ring can be made with a field perfectly oriented along the radial direction (D=1) with a Rint/Rext ratio equal to 0.8, by using an SmCo isotropic reinforcement in the internal part. The following table gives maximum values of the tensile stress reached in the ring with reinforcement, as a function of the internal radius R'int of the reinforcement.

These values were obtained by Finite Element calculations. It can be seen that an internal radius R'int less than or equal to 0.7 times the external radius of the ring (Rext) is sufficient to prevent cracking of the ring during manufacturing.

| $R'_{int}/R_{ext}$ | Maximum tensile stress (MPa) |
|---|---|
| 0.79 | 43 |
| 0.75 | 37 |
| 0.70 | 32 |
| 0.65 | 28 |
| 0.60 | 25 |
| 0.50 | 21 |

Application of the invention is not limited to this example alone. A specific reinforcement can be sized using the same principle for any geometry and any magnet types.

2. Manufacturing of the SrFeO Hexaferrite Type of Anisotropic Sintered Rings

The tensile strength of hexaferrites is higher than that of SmCo materials. However, it depends on several microstructural parameters including the grain size and shape.

Grains may be more or less elongated, and may be in the form of equiaxial grains or platelets, depending on the synthesis method used for hexaferrite powders. This morphology is characterised by the ratio between the grain length and height (L/H). The mechanical characteristics obtained with two types of grain morphology for a typical principal magnetic phase are given below:

| | Tensile strength MPa | Toughness MPa · m$^{1/2}$ |
|---|---|---|
| Equiaxial grains (L/H < 2) | 150 | 2.14 |
| Elongated grains (L/H = 5) | 85 | 2.36 |

These data show that the $SrFe_{12}O_{19}$ magnetic phase with a high tensile strength has the lowest toughness. In order to make a sintered ring with radial orientation, it is preferable to give priority to a grain morphology that leads to the highest tensile strength (equiaxial grains). However, in this case the material toughness is minimal which is penalising for the mechanical strength, for example during grinding operations. This invention demonstrates that a ring with a radial orientation made from hexaferrite can be manufactured with optimum toughness.

The case disclosed applies to a ring with perfect radial orientation (D=1) of which the outer part has a ratio of radii $R_{int}/R_{ext}$ equal to 0.85. Without the presence of reinforcement, the maximum tensile stress imposed by the sintering method is 90 MPa, which is higher than the tensile strength of the material with elongated grains. Therefore in this case, it is judicious to use equiaxial grains to confer a sufficient tensile strength (150 MPa) onto the material.

In using an internal reinforcement described below, the stress imposed by the method on the principal part can be significantly reduced without modifying its geometry ($R_{int}/R_{ext}$ equal to 0.85) or its degree of orientation (D=1). The following table describes possible configurations for the reinforcing part:

| | Solution 1 | Solution 2 |
|---|---|---|
| Ratio between the reinforcement internal radius and the ring external radius $R'_{int}/R_{ext}$ | 0.8 | 0.5 |
| Degree of alignment of the reinforcement | 0.97 | 0.5 |
| Maximum tensile stress in the reinforcement | 140 MPa | 145 MPa |
| Maximum tensile stress in the principal part | 40 MPa | 0 MPa |

In both solutions, the maximum stresses applied to the principal part of the ring are less than 50 MPa, such that elongated grains can be used and a toughness 10% more than the value obtained on a homogeneous ring can be achieved. The reinforcing part is then composed of equiaxial grains to resist the tensile stress transferred onto this part. It is advantageous to make a ring with radial orientation with optimum toughness because it can improve the strength of the magnet during machining operations that are frequently done after forming, to satisfy dimensional specifications. Application of the invention is not limited to this example alone. A specific reinforcement can be designed for other geometries and other magnet types, based on the same principle.

3. Manufacturing of the NfFeB Type of Anisotropic Sintered Rings

NdFeB type materials have a high tensile strength (more than 150 MPa for D=1). The ultimate strength increases significantly when the degree of alignment reduces. It reaches 330 MPa for an isotropic material (D=0.5).

This characteristic makes it possible to design thick NdFeB rings with radial orientation, without a risk of cracking during manufacturing.

The use of magnets installed on the outside surface of motor rotors creates additional tensile stresses along the tangential direction during rotation at high speed. These stresses are caused by centrifugal forces. The following relation can be used to estimate additional stresses at any point in the magnet:

$$\Delta\sigma=\rho R^2\Omega^2$$

ρ: material density
R: radial position in the ring
Ω: angular speed

These stresses are additional to manufacturing stresses and can cause rupture of the magnet when the resultant reaches the tensile strength of the magnet. The chosen example is a ring with a perfect radial orientation (D=1) with a ratio of radii $R_{int}/R_{ext}$ equal to 0.8 and an external radius $R_{ext}$ equal to 100 mm. After manufacturing by sintering, this homogeneous ring is stressed by the method to a maximum tensile stress of 70 MPa. When the ring is driven at 15000 rpm, the total stress is then 190 MPa which is higher than the tensile strength of the material (160 MPa for D=1) and will crack the magnet.

This invention provides a means of designing an NdFeB ring with radial orientation with the same dimensions $R_{int}/R_{ext}$ equal to 0.8 ($R_{ext}$ equal to 100 mm) and with the same magnetic characteristics (D=1), that can resist a rotation speed of 15 000 rpm. To achieve this, an internal reinforcement is provided made from the same material with a degree of alignment between 0.5 and 0.75 and characterised by the ratio of radii $R'_{int}/R_{ext}$ equal to 0.6. In this case, at 15 000 rpm, the tensile stress in the principal part is reduced to 50 MPa and the reinforcement is loaded to a maximum of 210 MPa, which is less than the tensile strength.

Application of the invention is not limited to this example alone. A specific reinforcement may be designed following the same principle for other geometries, magnet types and rotation speeds.

In the embodiment shown in FIGS. 1 and 2, the interface 10 between the principal part 4 and the reinforcing part 6 is circular, and more precisely cylindrical. According to another embodiment shown in FIG. 3, this interface 10 may be structured so as to improve the mechanical strength of the magnet and/or modulate the intensity of the magnetic field along the circumferential direction, after final magnetization.

To achieve this, the interface may have projections 12 all along it, for example in the form of teeth and recesses 14.

With reference to FIGS. 4a to 4d, we will describe a first preferred embodiment of a method for manufacturing the magnet shown in FIGS. 1 and 2. Nevertheless, this first embodiment and the embodiments that will be described below are equally applicable for manufacturing the magnet shown in FIG. 3 with a structured interface.

In this first preferred embodiment, a blank of the reinforcing part and a blank of the principal part are made by co-injection.

This is done by making the blank of the principal part from a first feedstock M1, comprising an anisotropic powder P1 of the ferromagnetic material. This powder P1 is mixed with a first vector V1 of the powder, corresponding to a polymeric/organic formulation, also called a polymeric binder. As is well known to an expert in the subject, the feedstock is injected as a thermoplastic material.

The powder in this first feedstock M1 is preferably anisotropic, in a polycrystalline form preferably obtained using the HDDR (hydrogenation-decomposition-desorption-recombination), technique or in a monocrystalline form preferably obtained from the alloy by the planar flow casting technique, identical to the so-called <<strip casting>> technique for the production of crystallised ribbons. The planar flow casting operation is followed by a hydrogenation dehydrogenation (HD) treatment and grinding by a gas jet to obtain monocrystalline particles from 0.5 to 15 μm.

Furthermore, the blank of the reinforcing part is made from a second feedstock M2, comprising an isotropic powder P2 with the same composition as powder P1, but composed of polycrystalline particles. The powder P2 is mixed with the same first vector V1 of powder P1, although a different vector can be used. The polycrystalline powder P2 is perfectly isotropic or it has a low degree of anisotropy, less than 0.8. This powder P2 may for example be derived from new treatment of scrapped parts or it may preferably be created from the alloy using the planar flow casting technique.

As shown diagrammatically in FIG. 4a, the two feedstocks M1, M2 are injected in a mould 16 in which there is a cavity 18 in the form of a tube delimited by the inner wall of a hollow cylinder 20 or similar, and the outer wall of a smaller diameter solid cylinder 22 located at the centre. The diameters, height and thickness of the cavity 18 are adjusted so as to produce rings with the required dimensions. Subsequent reductions in volume during debinding and sintering are taken into account in the geometric design of the mould 16.

Once the feedstocks M1, M2 have been injected at the required locations in the cavity 18 of the mould, the grains of powder P1 are oriented by application of a magnetic field, for example of the order of 0.5-3 T. The way of applying this field is known to those skilled in the art, who can thus use any means 24 for generating it. In this respect, means 24 have been shown diagrammatically in FIG. 4b, being associated with or integrated into the external part 20 of the mould. This field is usually obtained from a system of permanent magnets or conducting coils. It is used to align the axes of easy magnetization of anisotropic powder P1 grains along the radial direction of the blank as has been shown diagrammatically by the arrows 28 in FIG. 4b. On the other hand, this field does not have any effect on the isotropic powder P2, which makes it possible to obtain the required difference between the degrees of anisotropy D1, D2 along the radial direction of the blank.

The grains are oriented by magnetic field within the mould with the feedstock in the molten state. After injection, the parts are cooled and solidified, which fixes the orientation of grains in the two feedstocks.

Figure 4C:
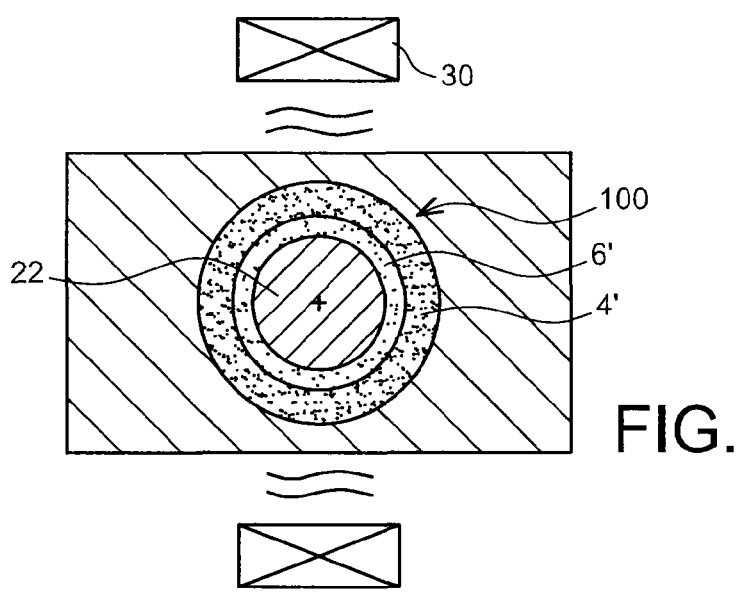
Figure 4D:
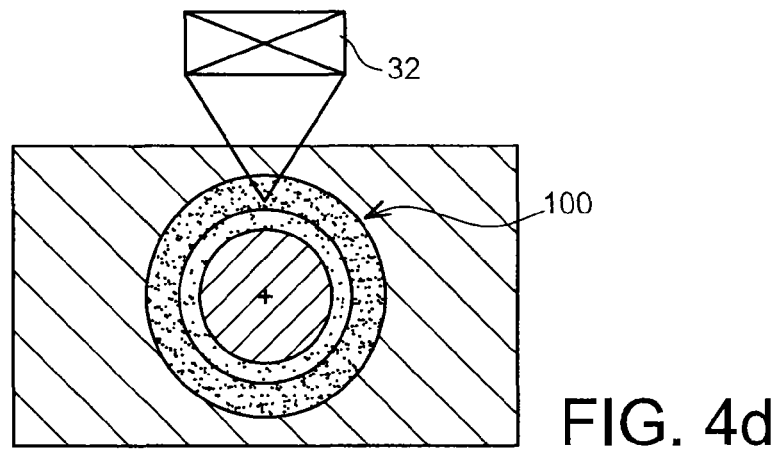

The vectors V1 are then eliminated, this operation being referred to as <<debinding>>, done by conventional means 30 shown diagrammatically in FIG. 4c. It may be a heat treatment at intermediate temperature, very much lower than the sintering temperature of powders P1 and P2 but sufficient to eliminate polymers. It may also be a chemical elimination treatment using a solvent, an aqueous solution or a treatment by circulation of a supercritical fluid, or a catalytic treatment.

A set of blanks 100 also according to this invention is obtained after this operation to eliminate vectors, including the blank 4' of the principal part, adjacent to and fixed to the blank 6' of the reinforcing part, as was referenced in FIG. 4c.

The set of blanks 100 is then sintered, conventionally, in a manner identical or similar to sintering of a homogeneous part. Therefore, this is co-sintering of two blanks, during which grains keep their orientations adopted after application of the magnetic field by means 24. Also in this case, the sintering means 32, diagrammatically shown in FIG. 4d, can be any means with which those skilled in the art will be familiar. The two reinforcing and principal parts are rigidly assembled at their interface during co-sintering.

The single piece part obtained is then stripped and magnetized in a conventional manner, so as to have the required remanent magnetic field.

Two variants can be envisaged for this first preferred embodiment. In a first variant, the blank 4' of the principal part is always made from the first feedstock M1 comprising the anisotropic powder P1 of the ferromagnetic material, and the first injection vector V1. Nevertheless, the blank 6' of the reinforcing part is made from a second feedstock M2 comprising the same anisotropic powder P1 mixed with a second injection vector V2 different from V1. This second vector V2 is chosen such that the aptitude of grains/particles to orient their axis of easy magnetization along the radial direction of the magnet, under the effect of the magnetic field produced by means 24 is less than it is for the first vector V1.

In a second variant, the blank 4' of the principal part and the blank 6' of the reinforcing part are both made from a feedstock M1, M2 comprising the anisotropic powder P1 and the first injection vector V1, but the content Tc1 of powder in the first feedstock M1 is different from the second powder content Tc2 in the second feedstock M2, such that the aptitude of grains-particles to orient their axis of easy magnetization along the radial direction of the magnet under the effect of the magnetic field generated by means 24 in the second feedstock M2, is less than it is for the first feedstock M1.

Also, when implementing the two variants, application of the magnetic field to the two feedstocks M1, M2 has more influence on the orientation of powder grains in the first feedstock, which means that the required difference between the degrees of anisotropy D1 and D2 is easily obtained.

FIGS. 5a to 5e diagrammatically show different successive steps in a method of manufacturing the magnet 1 by insert moulding, according to a second preferred embodiment. In this second mode, the blank of the reinforcing part is made before it is used as part of the mould to make the blank of the principal part.

Figure 5A:
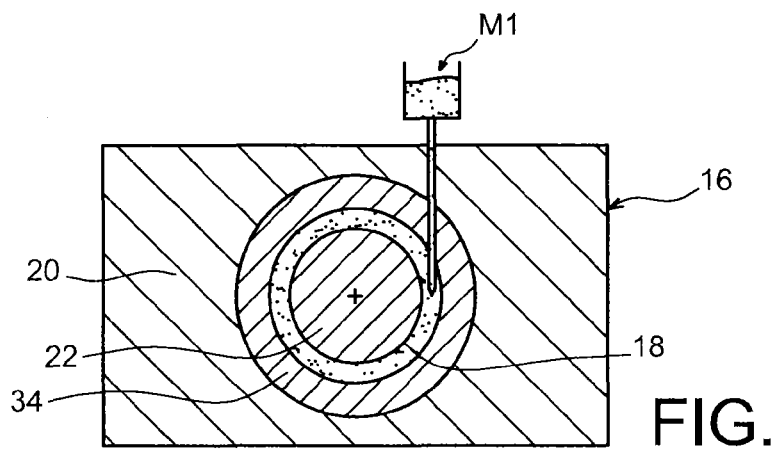
FIGS. 5a to 5e show different successive steps in a method of manufacturing the magnet in FIGS. 1 and 2, according to a second preferred embodiment of the invention.

The blank of the reinforcing part is moulded using one of the feedstocks M1, M2 described above. This moulding may be done in a mould 16 similar to the mould used in the previous embodiment, in which an insert 34 is arranged to adapt the shape of the cavity 18 to the shape of the required reinforcement. Such an insert is shown in FIG. 5a.

Figure 5B:
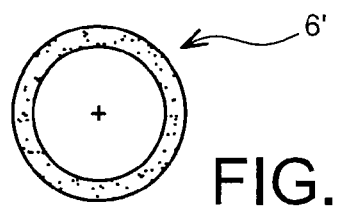

No orientation of the powder grains is made after injection into the mould, the powder thus maintaining an isotropic or slightly anisotropic nature. The part obtained after the feedstock has cooled, as shown in FIG. 5b and called the blank 6' of the reinforcing part, is stripped.

This blank 6' is then replaced in the mould 16, or it may stay in this mould if this mould is to be used for insert-moulding of the blank of the principal part of the magnet.

A feedstock M3 is used for the formation of this blank of the principal part, comprising the anisotropic powder P1 of ferromagnetic material, mixed with a third vector V3 for which the melting point is lower than the melting point of the vector V1.

Figure 5C:
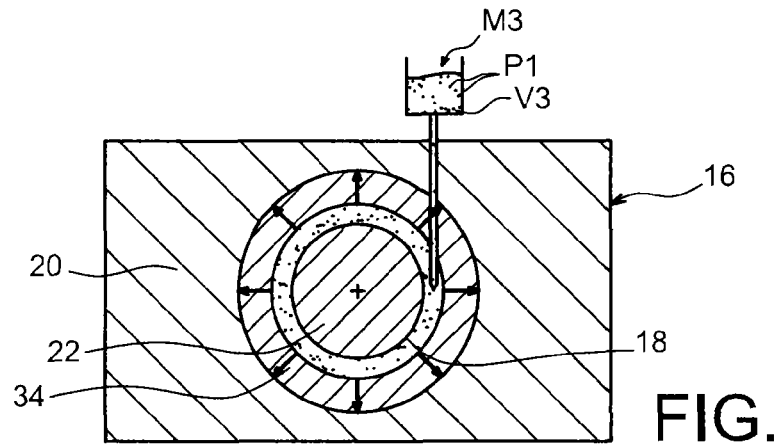

As shown in FIG. 5c, the second feedstock M3 is then injected into the mould 16 between the blank 6' and the external part of the mould 16.

Once the feedstock M3 has been injected into the mould, the grains of powder P1 are oriented by application of a magnetic field, for example of the order of 0.5-3 T, in the same way as described in the previous embodiment. Therefore, for the feedstock M3, this field aligns the axes of easy magnetization of particles of anisotropic powders P1 along the radial direction, as shown diagrammatically by the arrows 28 in FIG. 5c. On the other hand, this field has no effect on powder P1 of the blank 6', because the position and the orientation of grains in it are already fixed. This can give the required difference between the degrees of anisotropy D1 and D2.

Figure 5D:
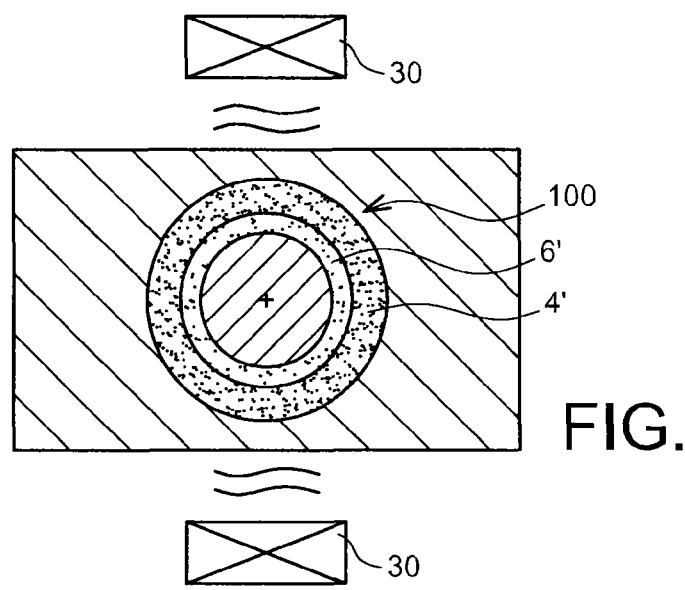

With reference to FIG. 5d, the method is continued in a manner similar to the method for the first embodiment, by elimination of vectors V1, V3 resulting in obtaining the set of blanks 100 comprising the fixed blanks 4' and 6'.

Figure 5E:
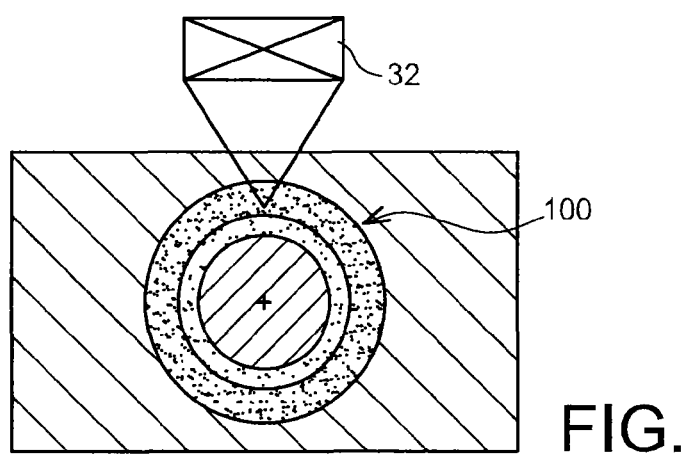

Then as shown diagrammatically in FIG. 5e, this assembly 100 is sintered and the single-piece part obtained and is then stripped and then magnetised conventionally so as to have the required remanent magnetic field.

FIGS. 6a to 6g diagrammatically show different successive steps in a method of manufacturing the magnet 1 using a third preferred embodiment. In this third embodiment, the blank of the reinforcing part is also made before being used as a mould for making the blank of the principal part.

The blank 6' is made with a separate mould or the same mould as that used later for the blank of the principal part. However, after forming and after the first or second feedstock M1, M2 comprising the powder P1 or P2 and the vector V1 has been ejected from the press, the vector V1 is eliminated using means 24, and partial sintering of this blank is done using means 32. These steps are diagrammatically shown in FIGS. 6a to 6c. Partial sintering may be done to obtain a density equal to between about 0.7 and 0.95 of the final density.

Figure 6A:
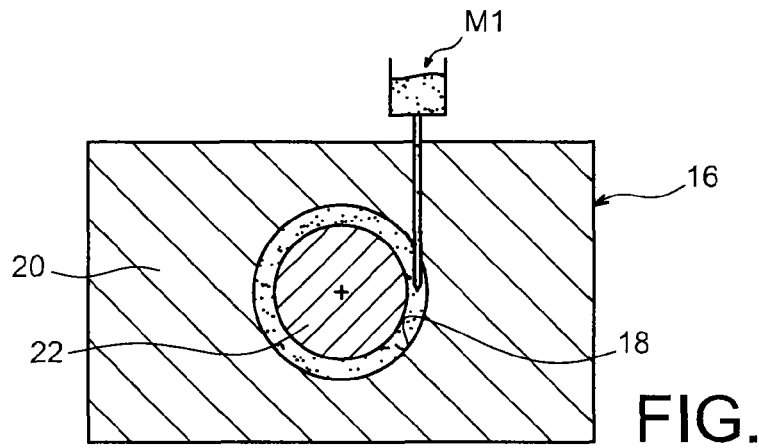
FIGS. 6a to 6g show different successive steps in a method of manufacturing the magnet in FIGS. 1 and 2, according to a third preferred embodiment of the invention.
Figure 6B:
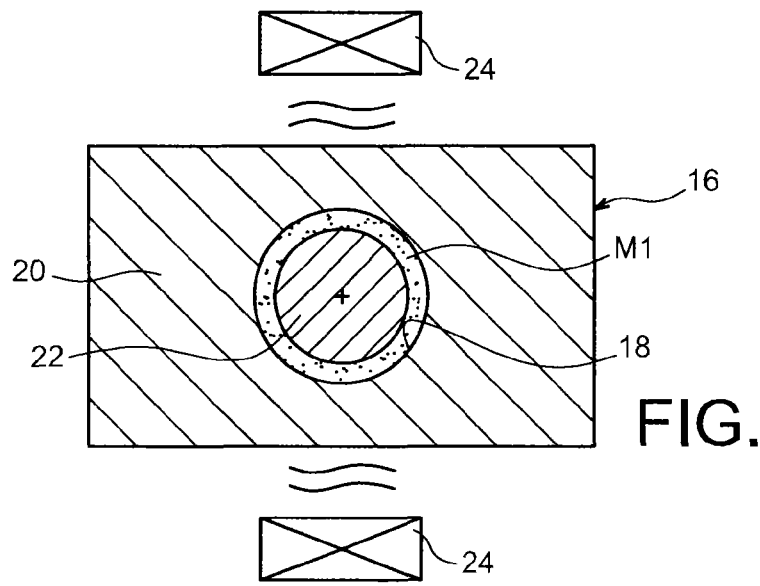
Figure 6C:
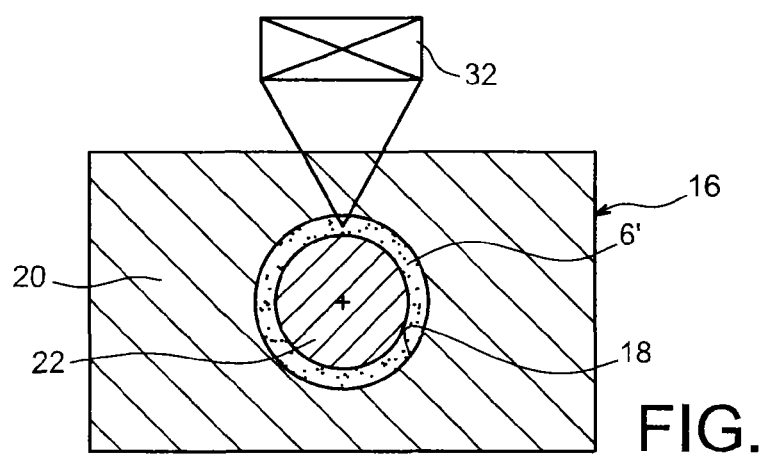
Figure 6D:
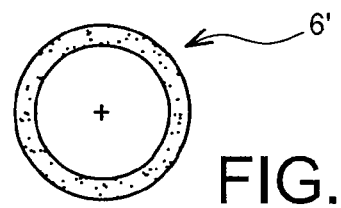

The partially sintered blank 6' is then stripped as shown in FIG. 6d, and then placed in the mould 16 for insert moulding of the blank of the principal part of the magnet. An insert may be placed in the recess of the blank 6', to reinforce its mechanical strength during insert moulding of the blank 4'.

The first feedstock M1 comprising the anisotropic powder P1 of the ferromagnetic material mixed with the vector V1 is used to form the blank of the principal part.

Figure 6E:
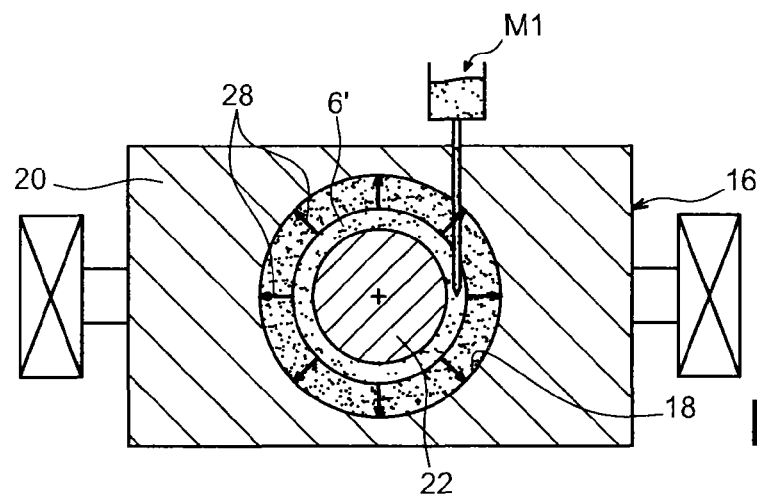

As can be seen in FIG. 6e, the first feedstock M1 is then injected into the mould 16 between the blank 6' and the external part of the mould 16.

Once the feedstock M1 has been injected into the mould, grains of the powder P1 are oriented by application of a magnetic field, for example of the order of 0.5-3 T, in the same way as described for the previous embodiment. Therefore, for the feedstock M1, this field can be used to align the axes of easy magnetization of grains of anisotropic powders P1 along the radial direction, as shown diagrammatically by the arrows 28 in FIG. 6e. On the other hand, this field has no effect on the powder P1 of the partially sintered blank 6', because the position and orientation of grains in it are already fixed. This can give the required difference between degrees of anisotropy D1 and D2.

Figure 6F:
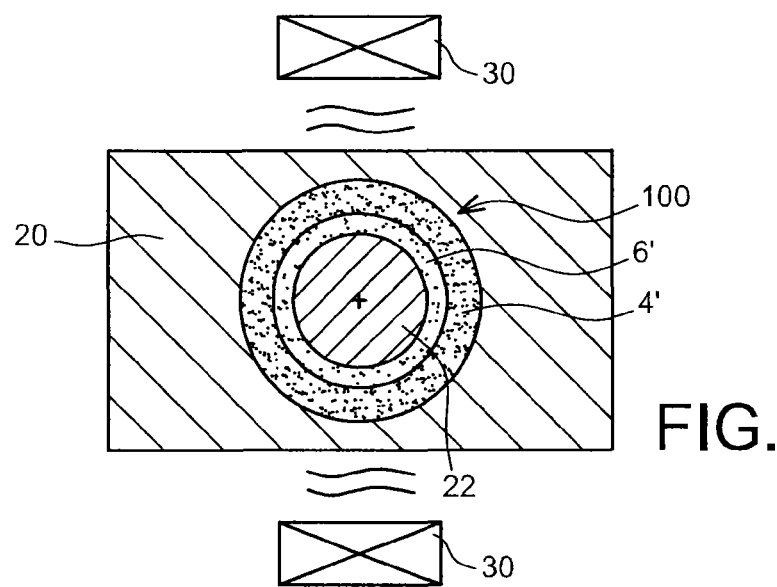

With reference to FIG. 6f, the method is continued in a manner similar to the method for the first embodiment, by elimination of the vector V1 leading to obtaining the assembly of blanks 100 including the fixed blanks 4' and 6', the second blank 6' of which is already partially sintered.

Figure 6G:
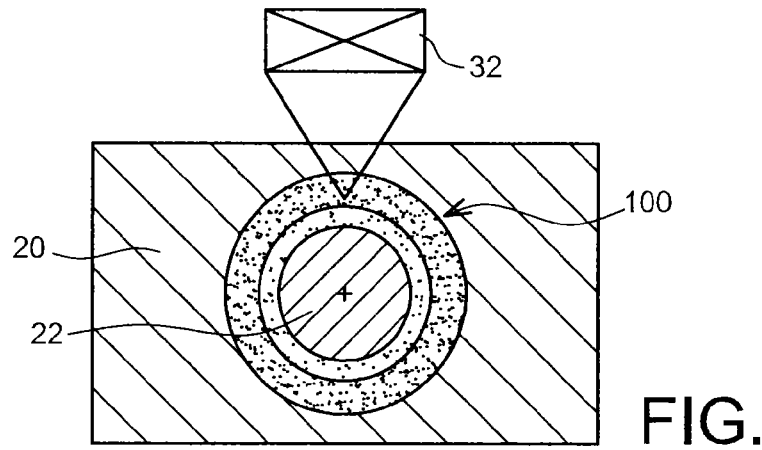

Then, as diagrammatically shown in FIG. 6g, this assembly 100 is stripped and then sintered, and the single-piece part obtained is magnetised conventionally, so as to have the required remanent magnetic field.

It should be noted that the residual porosity within the blank 6' before co-sintering may advantageously be used firstly to improve the junction with the principal part by an anchoring effect, and secondly to accompany sintering of the principal part in the tangential direction of the part and thus increase the final density of this part.

Finally, in a variant of this third embodiment, the reinforcement blank sintered at high density can be magnetised in a device independent of the mould, in order to form the source of the magnetic field producing the orientation of the anisotropic powder P1 during insert-moulding of the blank of the principal part. In this case, no specific orientation device is necessary during injection of the first feedstock M1 that will be used to form the blank 4'.

FIGS. 7a to 7e diagrammatically show various successive steps in a method of manufacturing the magnet 1 according to a fourth preferred embodiment. Unlike previous embodiments, the blanks in this fourth embodiment are made by cold powder compression, preferably by uniaxial pressing or by isostatic compression. However, any other technique for forming blanks from powder can be used.

Part of the tooling used to apply a cold powder compression technique by uniaxial pressing is shown in the figures. However, the cold isostatic powder compression technique is similar, and those skilled in the art will be capable of adapting the tooling to implement this isostatic compression technique.

The reinforcement is formed in advance by cold compression of the anisotropic powder P1, without being oriented. This is done by providing a cylindrical mould 16' comprising a cylindrically shaped rigid metal insert 22' placed at the centre. In the case of compression in a die, the mould is composed of a rigid hollow cylindrical die 18' shown in FIG. 7a. The powder P1 is placed in the die 18' and compressed using a press 50 or similar. The anisotropic particles of powder P1 are fixed at the end of this first compression and can no longer be aligned later by a magnetic field.

Figure 7A:
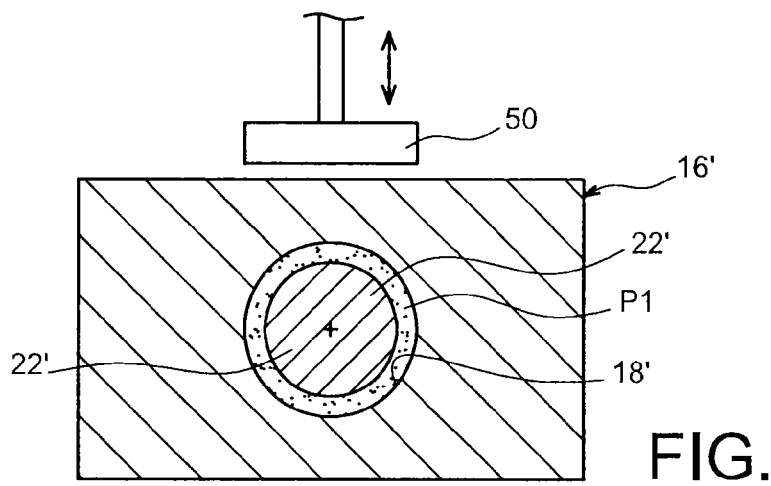
FIGS. 7a to 7e show different successive steps in a method of manufacturing the magnet in FIGS. 1 and 2, according to a fourth preferred embodiment of the invention.
Figure 7B:
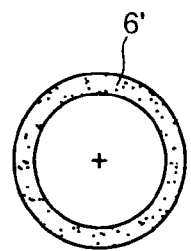
Figure 7C:
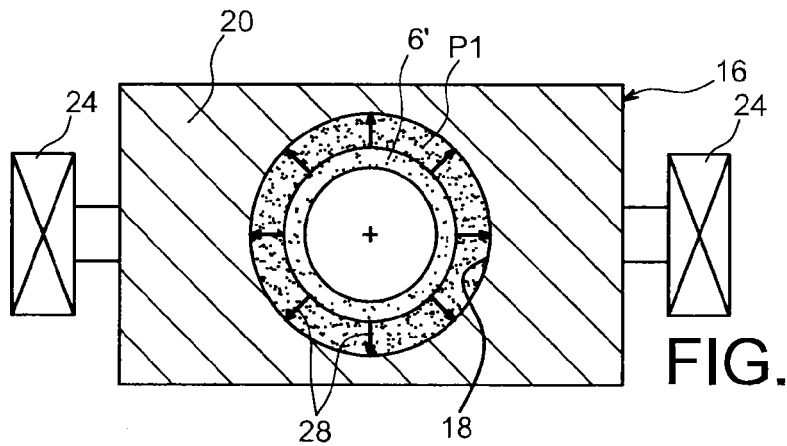

The result is a porous blank 6' that is extracted from the die as shown diagrammatically in FIG. 7b. The blank 6' has an isotropic or slightly anisotropic nature.

The blank 6' is then placed in another mould 16 to form the blank of the principal part of the magnet. The insert 22' of the mould 16' may possibly be placed in the recess of the blank 6', to reinforce its mechanical strength during formation of the blank 4' by compression.

Figure 7D:
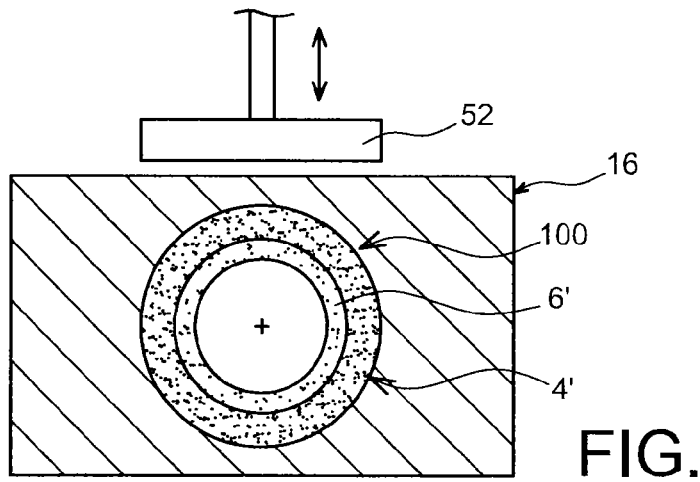
Figure 7E:
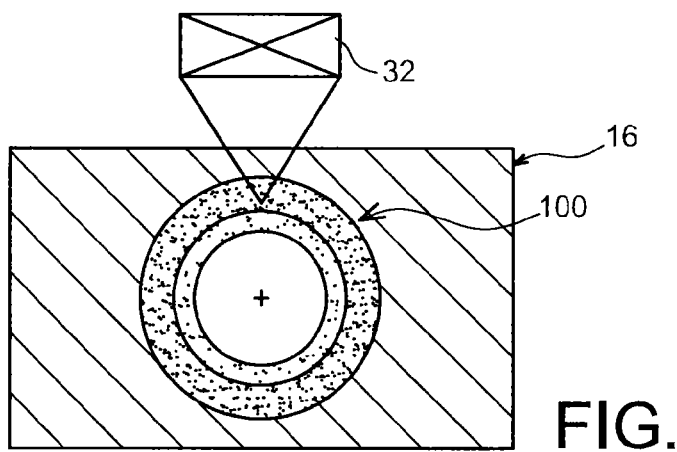

This blank of the principal part is formed using the same anisotropic powder P1 of ferromagnetic material, that is inserted in the die 18 of the mould 16 as shown diagrammatically in FIG. 7d.

At the end of filling, the grains in powder P1 are oriented by application of a magnetic field using means 24 dedicated to this function. In this embodiment, these means may be conducting coils inserted in the tooling of the press and producing a field of 1 to 2 T. For guidance, in the case of cold isostatic compression, powder filling is done in a removable flexible mould and the anisotropic powder P1 may be oriented by means of a device independent of the press, generating a field from 2 to 8 T.

The powder P1 of the blank of the principal part that now has suitably oriented grains is then compacted by a press 52, as shown diagrammatically in FIG. 7d.

This leads to obtaining the assembly of blanks 100 shown in FIG. 7d, this assembly is then sintered conventionally, in exactly the same way or in a similar way to sintering of a homogeneous part. Therefore, this is co-sintering of two blanks 4', 6', during which the compacted grains maintain their orientations adopted after application of the magnetic field by means 24. Also in this case, the sintering means 32, shown diagrammatically in FIG. 7e may all be means deemed to be suitable by those skilled in the art.

The single-piece part obtained is then stripped and then magnetised conventionally, so as to have the required remanent magnetic field.

Obviously, those skilled in the art may make various modifications to the invention that has just been disclosed solely as non-limitative examples. In particular, information about different embodiments of the manufacturing method may be combined.

The invention claimed is:

1. An annular magnet comprising:
a sintered principal annular part made from a ferromagnetic material that has a first degree of magnetic anisotropy in the radial direction; and
a sintered annular reinforcing part made from a ferromagnetic material with same principal magnetic phase as the ferromagnetic material forming the principal part, and that has a second degree of magnetic anisotropy in the radial direction, the first degree being higher than the second degree, wherein the sintered annular reinforcing part is fixed to the sintered principal part to form a sintered annular magnet having a radial orientation of the remanent magnetic field at all points around a periphery of the magnet.

2. A magnet according to claim 1, wherein the reinforcing part is arranged internal or external of a periphery of the principal part of the magnet.

3. A magnet according to claim 2, wherein the ratio between the average radial thickness of the principal part and the average radial thickness of the reinforcing part is between 0.1 and 5.

4. A magnet according to claim 1, wherein the ratio between the inside diameter and the outside diameter of the principal part of the magnet is between 0.5 and 0.85.

5. A magnet according to claim 1, wherein the ferromagnetic material forming the principal and reinforcing parts is one of following three types of compounds:
R—Fe—B alloys with the $R_2Fe_{14}B$ principal magnetic phase, wherein R is an element in the rare earths family;
R and Co alloys with $RCo_5$ and $R_2Co_{17}$ principal magnetic phases, wherein R is an element in the rare earths family;
hexaferrites with the $MFe_{12}O_{19}$ principal magnetic phase, wherein M=Ba or Sr.

6. A magnet according to claim 1, wherein the interface between the principal part of the magnet and its reinforcing part is structured.

7. A magnet according to claim 6, wherein the interface includes projections and recesses arranged alternately along the interface.

8. A sintered annular magnet with a radial orientation of the remanent magnetic field at all points around a periphery of the magnet, the magnet comprising:
a principal annular part made from a ferromagnetic material that has a first degree of magnetic anisotropy in the radial direction; and
an annular reinforcing part fixed to the principal part of the magnet, the reinforcing part being made from a ferromagnetic material with same principal magnetic phase as the ferromagnetic material forming the principal part, and that has a second degree of magnetic anisotropy in the radial direction, the first degree being higher than the second degree wherein the first degree of magnetic anisotropy is more than 0.8 and the second degree is less than 0.8, the ratio between the two being between 1 and 2.

9. A method of assembling a sintered annular magnet with a radial orientation of the remanent magnetic field at all points around a periphery of the magnet, the magnet having a principal annular part made from a ferromagnetic material that has a first degree of magnetic anisotropy in the radial direction; and an annular reinforcing part fixed to the principal part of the magnet, the reinforcing Part being made from a ferromagnetic material with same principal magnetic phase as the ferromagnetic material forming the principal part, and that has a second degree of magnetic anisotropy in the radial direction, the first degree being higher than the second degree, said method comprising:

providing a blank of the principal annular part made from a first ferromagnetic material powder, that has a first degree of magnetic anisotropy along the radial direction of the principal annular part; and providing a blank of the annular reinforcing part adjacent to the blank of the principal part of the magnet, the blank of the reinforcing part being made from a second ferromagnetic material powder with same principal magnetic phase as the first ferromagnetic material powder, that has a second degree of magnetic anisotropy along the radial direction of the annular reinforcing part, the first degree being higher than the degree, wherein the ferromagnetic material making up the first and second powders belongs to one of the following three types of compounds:

R—Fe—B alloys for which the principal magnetic phase is $R_2Fe_{14}B$, wherein R is an element in the rare earths family;

R and Co alloys for which the principal magnetic phases are $RCo_5$ and $R_2Co_{17}$, wherein R is an element in the rare earths family;

hexaferrites for which the principal magnetic phase is $MFe_{12}O_{19}$, wherein M=Ba or Sr.

10. A method of manufacturing a magnet according to claim 9, wherein the blanks of the principal part and of the reinforcing part are made using at least one powder forming technique, or by powder injection, or by powder cold pressing, and wherein blanks are then densified by co-sintering.

11. A method according to claim 10, wherein the blank of the reinforcing part and the blank of the principal part are made by co-injection, wherein the blank of the principal part is made from a first feedstock comprising a first anisotropic powder of the ferromagnetic material, and wherein the blank of the reinforcing part is made from a second feedstock comprising a second isotropic powder of a ferromagnetic material with same principal magnetic phase as the final anisotropic powder.

12. A method according to claim 10, wherein the blank of the reinforcing part and the blank of the principal part are made by co-injection, wherein the blank of the principal part is made from a first feedstock comprising a first anisotropic powder of the ferromagnetic material and a first injection vector, and wherein the blank of the reinforcing part is made from a second feedstock comprising the first anisotropic powder, and a second injection vector chosen such that the aptitude of powder particles to orient their axis of easy magnetization along the radial direction of the magnet under a magnetic field is less than the aptitude of the first vector.

13. A method according to claim 10, wherein the blank of the reinforcing part and the blank of the principal part are made by co-injection, wherein the blank of the principal part is made from a first feedstock comprising a first anisotropic powder of the ferromagnetic material and a first injection vector, and the blank of the reinforcing part is made from a second feedstock comprising the first anisotropic powder and the first injection vector, wherein the powder content ratio in the first feedstock being different from the second powder content ratio in the second feedstock such that the aptitude of powder particles to orient their axis of easy magnetization along the radial direction of the magnet under a magnetic field is less than the aptitude of the first feedstock.

14. A method according to claim 10, wherein the blank of the reinforcing part is made before being used as part of a mold to make the blank of the principal part.

15. A method according to claim 14, wherein the blank of the reinforcing part is partially sintered before being used as a mold for manufacturing the blank of the principal part.

16. A method according to claim 15, wherein the blank of the partially sintered reinforcing part is magnetized to orient axis of easy magnetization of grains of the blank of the principal part along the radial direction of the magnet, when the principal part is manufactured.

* * * * *